United States Patent [19]

Jungk

[11] Patent Number: 4,946,505

[45] Date of Patent: Aug. 7, 1990

[54] PROCESS FOR DYEING CONCRETE

[75] Inventor: Axel E. Jungk, Nauheim, Fed. Rep. of Germany

[73] Assignee: Chemische Werke Brockhues AG, Walluf, Fed. Rep. of Germany

[21] Appl. No.: 380,744

[22] Filed: Jul. 17, 1989

Related U.S. Application Data

[63] Continuation of Ser. No. 159,964, Mar. 29, 1988, abandoned.

[30] Foreign Application Priority Data

Jun. 9, 1986 [DE] Fed. Rep. of Germany ....... 3619363
Jun. 5, 1987 [WO] PCT Int'l Appl. ... PCT/DE87/00262

[51] Int. Cl.$^5$ ............................................. C04B 20/00
[52] U.S. Cl. .................................... 106/712; 106/725; 106/810; 106/809; 106/808; 524/5; 524/6
[58] Field of Search ................. 106/101, 460, 476, 90, 106/97, 85; 524/5, 6

[56] References Cited

U.S. PATENT DOCUMENTS

| | | | |
|---|---|---|---|
| 20,776 | 7/1938 | Amon | 106/90 |
| 2,221,175 | 11/1940 | Bechtold | 106/94 |
| 3,068,109 | 12/1962 | Rodeffer | 106/101 |
| 4,162,287 | 7/1979 | Gunnell | 425/222 |
| 4,308,073 | 12/1981 | Mills | 106/475 |
| 4,336,546 | 6/1982 | Edwards | 346/74.7 |
| 4,366,139 | 12/1982 | Kuhner | 106/472 |
| 4,451,231 | 5/1984 | Murray | 34/12 |

FOREIGN PATENT DOCUMENTS

| | | |
|---|---|---|
| 2940156 | 4/1980 | Fed. Rep. of Germany . |
| 2450273 | 9/1980 | France . |
| 149224 | 12/1978 | Japan . |
| 58-125759 | 7/1983 | Japan . |
| 1537663 | 1/1979 | United Kingdom . |

Primary Examiner—Lewis T. Jacobs
Assistant Examiner—David Buttner
Attorney, Agent, or Firm—Cushman, Darby & Cushman

[57] ABSTRACT

Coloring materials used in a process of dyeing concrete consist of pigment granules other than compacted or briquetted granules. The granules consist of one or more pigments, one or more binders for promoting the dispersing of the pigments in the concrete, and optional other additives. Such pigment granules, particularly bead granules, will easily dissolve in the concrete mixer and will be homogeneously dispersed in the concrete.

11 Claims, No Drawings

PROCESS FOR DYEING CONCRETE

This is a continuation of application Ser. No. 07/159,964, filed Mar. 29, 1988, now abandoned.

This invention relates to a process of dyeing concrete.

For the purposes of the invention, concrete is a cement-containing material for making concrete blocks and concrete slabs, concrete roofing tiles, composite blocks, as well as fibrated cement mortar and/or cement mortar.

Concrete is a proven material of construction and as exposed concrete serves also for aesthetic purposes. Exposed concrete made from a dyed concrete mix will keep its color for many years without a need for maintenance.

On the other hand, concrete surfaces which have been decorated by means of paints must be renewed after short intervals of time. Dyed concrete is used, e.g., in facades, slabs, pavement blocks, roofing tiles, nose barrier walls, bank-stabilizing structures, bridges and similar structures and, for instance, also in the form of dyed mortar for facade decoration.

Concrete is dyed with inorganic pigments and more recently also with organic pigments.

Pigments which are suitable for concrete and have proved satisfactory for a prolonged time are, e.g., manganese oxide, iron oxides and carbon. Particularly pigments based on carbon or iron oxide have proved highly satisfactory in practice.

But problems arise in the production of dyed concrete. Dust is raised from the pigment powder and its use results in a soiling of human beings, machines and the surrounding premises.

Pigments have also the disadvantage that owing to their small particle size they tend to form bridges in storage, particularly in the presence of some moisture.

For this reason pigment powders are no longer freely flowable after a silo storage for a short time.

As a result, their removal from a silo is difficult and involves therefor substantial human effort and a high expenditure in equipment.

For this reason it is also rather difficult to meter them by means of screw conveyors or vibrating trough conveyors.

It has been endeavored in the prior art to solve the problems arising with pigment powders owing to the raising of dust and in silo storage and in automatic metering and for that purpose the pigments in the form of aqueous pigment pastes were used in concrete.

Most of such pastes contain about 70 to 30% water as a vehicle as well as surface-active substances.

Whereas such aqueous pigment pastes have advantages over dry pigment powders, considerable disadvantages are involved in the use of such pastes.

In practice it is not possible to store the pastes in silos or other high-capacity containers for a prolonged time because the pastes would segregate by settling and would form solid deposits in part.

Owing to the high water content, the costs of packaging and transporting the aqueous pigment pastes are doubled. Another important disadvantage resides in that such pastes cannot be used at all if the initial moisture content of sand and coarse aggregate used in making concrete is so high that an addition of water even in the form of aqueous concrete pastes will intolerably reduce the consistency of the concrete.

When paints and plastics are to be dyed, the last-mentioned disadvantages can be avoided on principle if the pigment is used in the form of granules rather than pastes or powders.

Particularly pigments which are deleterious to health have been used in the form of granules in the plastic industry for many years.

The production and use of granules in general have a longstanding tradition in many fields (see H. Rumpf in "Chemie-Ing.-Technik, 30, 1958, No. 3, No. 4, No. 5", W. C. Peck in "Chemistry and Industry, issue of Dec. 20, 1958, pages 1674 FF", and for making granules from molten material see U.A.W. Boretzky in "Fette-, Seifen-, Anstrichmittel, No. 4, 1967").

For instance, the use of briquettes is common in the coal and ore fields; microcapsules are used in copying paper; animal feed consisting of compact granules is found in silos in agriculture; dust free nitrocellulose pigmentconcentrates are satisfactorily dissolved in solvents in the production of paints; carbon black pellets are used in the production of rubber; and PVC is used in the form of bead granules made by spraying.

On the other hand, it is not known in the art to dye concrete with pigment granules because the pigment granules known in the art exhibited disadvantages when used in the dyeing process.

During the mixing cycle the shear forces exerted in the concrete on the granules are not sufficient for a dispersion of the pigment. As a result:

1. In the concrete, the pigment granules form spots and color nests mar the surface of the concrete.

2. Because the pigments are much less effectively dispersed than pigment powders in the concrete mixer during the mixing cycle, the coloring power of the granules is inadequately utilized so that the pigment granules must be used in a larger quantity than pigment powders in order to impart a given hue to the concrete mix.

3. With the binder-containing pigment granules, foreign matter is introduced into the concrete whereas the undesired dispersing properties are not improved.

4. The moisture content of the concrete and the time available are not sufficient for a dissolving of binder-containing granules.

Owing to these disadvantages it is currently usual to grind even spray-dried pigments so as to transform them to a powder before they are used to dye concrete.

For this reason it is an object of the invention to provide for the dyeing of concrete a process in which the disadvantages involved in the use of dye powders, of aqueous pigment pastes, or of pigment granules known in the art are avoided.

In accordance with the invention that object is accomplished in that the coloring material used to dye concrete consists of granules which essentially consist of pigment and one or more binders for promoting the dispersing of the pigment in the concrete. Whereas suitable pigment granules can be made by any of numerous methods known in the art, granules made by briquetting and compacting processes cannot be used in the process in accordance with the invention because they can be dispersed only with difficulty.

Built-up granules may be used.

It is also possible to use particulate granules which are made by a drying of mixtures consisting of pigments, binders, liquid, preferably water, and optional other substances.

Bead granules are particularly suitable.

It has surprisingly been found that the granules mentioned above are effectively dissolved in the concrete mixer.

For this reason they can well be used in practice.

They will become homogeneously distributed in the concrete so that exposed concrete will be dyed satisfactorily without a formation of spots and color nests.

Their use is economical because dyeing to a given color saturation can be effected with pigment in granules in the same quantity as with the pigment in powder form.

The granules used in accordance with the invention flow freely from a silo and can be pneumatically conveyed.

Virtually no dust will be raised as the granules are handled. In that respect the bead granules are superior in handling properties to granules of other forms.

For this reason the process in accordance with the invention is particularly suitable for a clean automatic dyeing of concrete.

Suitable pigments are, e.g., manganese oxide, iron oxides, organic pigments and/or carbon.

A preferred pigment is the carbon pigment.

Finely ground coal is less preferred because it has only a low coloring power.

Mixtures of the several pigments are also used.

In the granules used in accordance with the invention and consisting preferably of bead granules the pigment is mixed with a binder which promotes the dispersing of the pigment in the concrete.

Other binders which will not be disturbing in the concrete may be used in addition, if desired.

The following commercially available binders, which will promote the dispersing of the pigments in concrete, may in combination with pigments, be incorporated in the granules, preferably in the bead granules, used for dyeing: Alkylphenol, such as Igepal C ®; a protein-fatty acid condensation product, such as Lampeon ®; Alkylbenzene sulfonate, also in the form of its salt, such as Marlon ®; Alkylnaphthalene sulfonate, such as Necal BXR ®; Lignin sulfonate, such as spent sulfite liquor, e.g., Waldhoflauge ®; Sulfated polyglycol ether, e.g., of fatty alcohols or alkyl phenols, or its salt; a melamine-formaldehyde condensated, a naphthalene-formal-dehyde condensate; gluconic acid, other polyhydroxy compounds which are innocuous to the concrete, salts of low-molecular-weight partial esters of styrene-maleic anhydride copolymers and of copolymers of vinyl acetate and crotonic acid.

A particularly preferred binder is lignin sulfonate, such as ammonium lignin sulfonate.

The granules which may be used in the process in accordance with the invention can be made by any of numerous processes. In the form of built-up granules they are preferably made by means of conventional rotating suitable pelletizing plates, such as are available from Eirich, in that the pigment powders are fed via metering screw conveyors and the binders dissolved in water are delivered in drops to the plate, and the pellets having a size of about 1 mm are separated via an overflow and are then dried.

Instead of a granulating plate, an inclined rotating granulating drum, such as is available from Dela Granuliertechnik, may be used. The pigment particles roll on the granulating plate and in the drum and are thus caused to agglomerate and to be consolidated.

In another embodiment, granules for use in the process in accordance with the invention may be obtained by drying a mixture of binder, pigment and liquid, preferably water, and optional other additives.

For instance, such mixtures may be applied as a paste in a thin layer to a roll dryer and may then be dried and reduced to fine granules.

Such a mixture may alternatively be dried as a thin layer on a belt drier and may be reduced thereon to fine granules.

The granules used in the process in accordance with the invention preferably consist of bead granules.

Bead granules are produced from mixtures of pigment, binder and liquid, preferably water, and optional other additives by means of spray driers using nozzles for discharging one substance or a plurality of substances or using atomizing discs in a spray tower.

The bead granules are obtained as microgranules so that 90% of the pigment particles have a size from 20 to 500 microns, particularly from 50 to 300 microns.

The binder for promoting the dispersing of the pigment in the concrete is used in an amount of 0.1 to 15% by weight of the granules, preferably 1 to 8% by weight and particularly 2 to 6% by weight.

The invention will now be explained more in detail with reference to the Examples.

EXAMPLE 1

Production of Bead Granules Which Contain Black Iron Oxide

A slurry of 53% by weight black iron oxide and 2.0% by weight binder (Hansa Am, an ammonium lignin sulfonate powder available from Lignin Chemie Waldhof-Holmen GmbH), balance water, is spray-dried in a countercurrent/cocurrent operation in a spray-drying plant comprising nozzles for atomizing under pressure.

The atomizing pressure is 13 to 18 bars, the entrance temperature of the drying air is 280° to 325° C., and the exhaust air temperature 115° to 130° C.

The product obtained consists of freely flowable, coarse bead granules, which are free of dust and have a residual moisture content of 0.3 to 1.3% and an apparent density from 810 to 820 g/l.

The bead granules had a mean particle size of 150 to 250 μm and a high mechanical stability.

EXAMPLE 2

Production of Carbon-containing Bead Granules

In the same manner as in Example 1, bead granules were made from an aqueous slurry which contained 33% by weight carbon pigment and 1.5% by weight ammonium lignin sulfonate as a binder (AM 250 Hansa available from Lignin-Chemie Waldhof-Holmen GmbH.

But the atomizing nozzles were operated under an atomizing pressure of 10 to 16 bars, the entrance temperature of the drying air amounted to 320° to 400° C. and the exhaust air temperature amounted to 125° to 150° C.

Freely flowable, coarse bead granules were obtained, which had a low dust content and had a residual moisture content from 1.2 to 4.2% and an apparent density from 370 to 400 g/l.

The bead granules had a mean particle size from 150 to 200 μm and had an even higher stability than the bead granules which had been obtained in Example 1 and contained iron oxide pigment.

EXAMPLE 3

Preparation of Bead Granules from a Pigment Dispersion Which Contained Iron Oxide and Carbon By the same method as in Example 1, bead granules were made from an aqueous slurry consisting of 1.3 parts ammonium lignin sulfonate
4.7 parts carbon pigment
22 parts yellow iron oxide
22 parts red iron oxide and
50 parts water The atomizing pressure amounted to 11 to 16 bars, the entrance temperature of the drying air was 280° to 300° C. and the exhaust air temperature 90° to 110° C.

The resulting bead granules are coarse, freely flowable and free of dust.

The residual moisture content is 2 to 2.2%.

The apparent density is about 600 to 650 g/l.

EXAMPLE 4

A concrete mixer (type Schlosser) having a cubic capacity of 1 m³ was operated for 15 minutes to mix 1,560 kg sand and, in accordance with the invention, 18 kg black iron oxide in the form of bead granules prepared in Example 1. 440 kg Portland cement were then added and were homogenized with the previously obtained mixture for 15 minutes. The mixer is then emptied and the mix is used to make concrete roofing tiles.

CONTROL EXAMPLE 1

The process is the same as in Example 4.

Instead of the bead granules in accordance with the invention, the same quantity (18 kg) of black iron oxide is used in powder form.

The moist concrete and the roofing tiles hardened for 24 hours were compared in color. Significant differences were not observed.

EXAMPLE 5

The procedure is the same as in Example 4.

But 7 kg carbon bead granules obtained in Example 2 were used for dyeing.

CONTROL EXAMPLE 2

The procedure is the same as in Example 5.

7 kg carbon pigment in powder form were used for dyeing.

The moist concrete and the roofing tiles that had been hardened for 24 hours were compared.

Significant differences in color were not observed.

EXAMPLE 6

The procedure is the same as in Example 4.

20 kg of the brown bead granules obtained in Example 3 were used.

CONTROL EXAMPLE 3

The procedure is the same as in Example 4.

20 kg of mixed powders consisting of the individual components of the pigments used in Example 3 are now used for dyeing.

CONTROL EXAMPLE 4

The procedure is the same as in Example 4.

40 kg of the pigment slurry that was spray-granulated in Example 3 were now used for drying. The quantity of water added to the concrete mix was reduced from 100 kg to 80 kg to compensate for the water content of the pigment slurry which was added.

RESULTS OF EXAMPLE 6 AND OF CONTROL EXAMPLES 3 AND 4

The moist concrete and the roofing tiles that had been hardened for 24 hours, which had been obtained in Example 6 and in Control Examples 3 and 4, were compared in color.

No differences were observed between the concrete that had been dyed in accordance with the invention and the concrete obtained in Control Example 4.

The dyed concrete obtained in Control Example 3 had a distinctly lower degree of homogeneity.

EXAMPLE 7

A 1–m³ concrete mixer (type Drais) was operated for 10 seconds to mix 975 kg sand, 580 kg gravel and, in accordance with the invention, 10 kg black iron oxide in the form of bead granules obtained in Example 1. 200 kg Portland cement were then added to the mix, which was subsequently homogenized for 15 seconds. 100 l water were added under continuous homogenization. After a total mixing duration of 60 s the mixer was emptied. The concrete mix was used to make a composite concrete pavement.

CONTROL EXAMPLE 5

The procedure is the same as in Example 7.

Instead of the bead granules in accordance with the invention, 10 kg black iron oxide in the form of a powder were added.

RESULTS OF EXAMPLE 7 AND OF CONTROL EXAMPLE 5

The moist concretes and the composite blocks that had been hardened for 28 days were compared in color. The blocks made in accordance with the invention were somewhat darker and more uniformly dyed than blocks dyed with iron oxide powder.

EXAMPLE 8

The procedure was the same as in Example 7.

3.3 kg of the carbon bead granules obtained in Example 2 were used as a coloring material in accordance with the invention.

CONTROL EXAMPLE 6

The procedure was the same as in Example 7.

3.3 kg of the carbon pigment powder obtained in Example 2 were used as a coloring material.

RESULTS OF EXAMPLE 8 AND CONTROL EXAMPLE 6

The moist concretes and the composite blocks which had been made from the concrete and hardened for 28 days were compared.

Differences in color were not observed.

EXAMPLE 9

The procedure was the same as in Example 7.

In accordance with the invention, 11 kg bead granules obtained in Example 3 were used for dyeing.

CONTROL EXAMPLE 7

The procedure was the same as in Example 7.

In accordance with the prior art, 22 kg of the slurry used in Example 3 to make bead granules were used for dyeing in accordance with the prior art. Water was used in an amount of 89 kg rather than 100 kg to compensate for the water content introduced into the concrete by the slurry.

RESULTS OF EXAMPLE 9 AND CONTROL EXAMPLE 7

A comparison of the two moist concrete mixes and of the blocks that had been hardened for 28 days did not reveal differences in color quality.

I claim:

1. A process of dyeing concrete comprising mixing pigment-containing granules with cement and aggregate at conditions sufficient to result in a generally homogeneous dispersal of pigment in the concrete, wherein:
   pigment-containing granules other than compacted or briquette granules are used,
   each granule consisting essentially of at least one pigment selected from the group consisting of manganese oxide and iron oxide and of at least one binder for promoting the dispersal of the pigment in the concrete,
   at least 90% of the granules have a particle size of about 20 microns or more, and
   the finite water content of the granules is not in excess of about 4.2%.

2. A process according to claim 1 wherein the weight of the binder in each granule comprises 0.1 to 15% of the total weight of the granule.

3. A process according to claim 1, characterized in that the binder comprises at least one material selected from the group consisting of alkylbenzene sulfonate, alkylnaphthalene sulfonate, lignin sulfonate, a sulfated polyglycol ether, a melamineformaldehyde condensate, a naphthalene-formaldehyde condensate, gluconic acid, a salt of low-molecular-weight partial ester of a styrene-maleic anhydride copolymer and a copolymer of vinyl acetate and crotonic acid.

4. A process according to claim 1, characterized in that the binder comprises a lignin sulfonate.

5. A process according to claim 1, characterized in that the granules are prepared by built-up granulation.

6. A process according to claim 1, characterized in that the granules have been made by drying a mixture comprising pigment, binder and liquid.

7. A process according to claim 1 characterized in that the granules further contain additives.

8. A process according to claim 1 wherein said pigment granules are formed into beads by spray drying a mixture comprising pigment and binder prior to mixing with aggregate and cement.

9. A process according to claim 1, characterized in that the granules have been made by the spray-granulation of a mixture comprising pigment, binder and liquid.

10. A process according to claim 9, characterized in that the liquid consists essentially of water.

11. A process of dyeing concrete comprising mixing pigment-containing granules with cement and aggregate at conditions sufficient to result in a generally homogeneous dispersal of pigment in the concrete, wherein:
    pigment-containing granules other than compacted or briquette granules are used as a coloring material,
    each granule consisting essentially of at least one pigment selected from the group consisting of manganese oxide and iron oxide and of at least one binder for promoting the dispersal of the pigment in the concrete,
    the finite water content of the granules is not in excess of 4.2%.

* * * * *

US004946505C1

(12) EX PARTE REEXAMINATION CERTIFICATE (6172nd)
United States Patent
Jungk

(10) Number: US 4,946,505 C1
(45) Certificate Issued: Apr. 8, 2008

(54) PROCESS FOR DYEING CONCRETE

(75) Inventor: Axel E. Jungk, Nauheim (DE)

(73) Assignee: Chemische Werke Brokhues AG Corporation

Reexamination Request:
No. 90/005,925, Feb. 13, 2001
No. 90/006,138, Nov. 2, 2001
No. 90/006,454, Nov. 19, 2002

Reexamination Certificate for:
Patent No.: 4,946,505
Issued: Aug. 7, 1990
Appl. No.: 07/380,744
Filed: Jul. 17, 1989

Related U.S. Application Data

(63) Continuation of application No. 07/159,964, filed on Mar. 29, 1988, now abandoned.

(30) Foreign Application Priority Data

Jun. 9, 1986 (DE) .............................................. 3619363
Jun. 5, 1987 (WO) ................................ PCT/DE87/00262

(51) Int. Cl.
*C04B 14/00* (2006.01)

(52) U.S. Cl. .................. 106/712; 106/725; 106/808; 106/809; 106/810; 524/5; 524/6

(58) Field of Classification Search .................. None
See application file for complete search history.

(56) References Cited

U.S. PATENT DOCUMENTS

| | | | | |
|---|---|---|---|---|
| 1,972,207 | A | 9/1934 | Tucker | 106/24 |
| 1,972,208 | A | 9/1934 | Tucker | 106/24 |
| 2,221,175 | A | 11/1940 | Bechtold | 106/27 |
| 2,491,832 | A | 12/1949 | Richter et al. | 260/124 |
| 2,690,398 | A | 9/1954 | Guertler et al. | 106/165 |
| 2,770,600 | A | * 11/1956 | Ricciardi | 510/443 |
| 2,872,329 | A | 2/1959 | Scripture et al. | 106/92 |
| 3,068,109 | A | 12/1962 | Rodeffer | 106/98 |
| 3,448,096 | A | 6/1969 | Read | 260/124 |
| 3,617,358 | A | 11/1971 | Dittrick | 117/105.2 |
| 3,632,257 | A | 1/1972 | Ashizawa | 425/222 |
| 3,720,528 | A | 3/1973 | Jordan | 106/90 |
| 3,836,378 | A | 9/1974 | Hahnkamm et al. | 106/288 |
| 3,843,380 | A | 10/1974 | Beyn | 106/300 |
| 4,042,653 | A | 8/1977 | Beyn | 264/7 |
| 4,134,725 | A | 1/1979 | Buchel et al. | 8/79 |
| 4,188,231 | A | 2/1980 | Valore | 106/90 |
| 4,264,552 | A | 4/1981 | McMahon et al. | 264/117 |
| 4,277,288 | A | 7/1981 | Lawrence et al. | 106/309 |
| 4,285,994 | A | 8/1981 | Pearce et al. | 427/222 |
| 4,310,483 | A | 1/1982 | Dorfel et al. | 264/117 |
| 4,345,944 | A | 8/1982 | Kazama et al. | 106/90 |
| 4,366,139 | A | 12/1982 | Kühner et al. | 423/449 |
| 4,440,577 | A | 4/1984 | Marcellis et al. | 106/90 |
| 4,450,106 | A | 5/1984 | Forss | 260/124 |
| 4,494,994 | A | 1/1985 | Cioca et al. | 105/308 |
| 4,704,230 | A | 11/1987 | Blackmore | 252/502 |
| 4,851,137 | A | * 7/1989 | Weinstein | 510/515 |
| 4,915,741 | A | 4/1990 | Biagini et al. | 106/314 |
| 5,085,705 | A | 2/1992 | Withiam | 105/287.17 |
| 5,176,753 | A | 1/1993 | Brook | 106/819 |
| 5,256,199 | A | 10/1993 | Yamato et al. | 106/823 |
| 5,275,652 | A | 1/1994 | Dastol | 106/482 |
| 5,389,137 | A | 2/1995 | Linde et al. | |
| 5,401,313 | A | 3/1995 | Supplee et al. | 106/712 |
| 5,484,481 | A | 1/1996 | Linde et al. | |
| 6,635,107 | B2 | 10/2003 | Egger et al. | |
| 2002/0185040 | A1 | 12/2002 | Egger et al. | |

FOREIGN PATENT DOCUMENTS

| | | |
|---|---|---|
| AT | 381299 B | 9/1984 |
| AT | 381 299 | 2/1986 |
| DE | 2425234 | 12/1975 |
| DE | 24 25 234 | 12/1975 |
| DE | 2908202 | 10/1980 |
| DE | 3918694 | 10/1990 |
| DE | 19731698 | 1/1999 |
| DE | 10002559 | 8/2001 |
| EP | 0191278 | 8/1986 |
| EP | 0567882 | 11/1993 |
| EP | 0650939 | 5/1995 |
| EP | 0657511 | 6/1995 |
| WO | WO 94/18137 | 8/1994 |

OTHER PUBLICATIONS

Hof et al., Betonwerk + Fertigteil–Technik (Concrete Plant and Precast Technology) "Farbige Betone" ("Coloured Concrete"), (published Jul. 1984).

Jager et al., Betonwerk + Fertigteil–Technik (Concrete Plant and Precast Technology) "Neue Farben fur Betonsteine" ("New Colours for Concrete Pavings"), (published Aug. 1982).

Stadlmuller et al., Betonwerk + Fertigteil–Technik (Concrete Plant and Precast Technology) Die Dosierung von Eisenoxidpigmenten bei der Herstellung farbiger Betonwaren (The Dosage of Iron Oxide Pigments in the Production of Coloured Concrete Products), (published Jan. 1983).

Jager et al., Betonwerk + Fertigteil–Technik (Concrete Plant and Precast Technology) "Praxis der Betoneinfarbung" ("Practical Methods of Colouring Concrete"), (published Sep. 1983).

Declaration of Ronald Rapaport, 5 pgs. Oct. 11, 2002.

Declaration of Christoph Britz Under 37 CFR 1.132, 3 pgs., Nov. 18, 2002.

Jul. 10, 2002, Response to Office Action.

Declaration of David B. Mobbs, 17 pgs, Jun. 11, 1996.

Aitcin, et al., "Superplasticizers: How They Work and Why They Occasionally Don't," *Concrete International*, pp. 45–52 (1994).

(Continued)

Primary Examiner—Jerry D. Johnson

(57) ABSTRACT

Coloring materials used in a process of dyeing concrete consist of pigment granules other than compacted or briquetted granules. The granules consist of one or more pigments, one or more binders for promoting the dispersing of the pigments in the concrete, and optional other additives. Such pigment granules, particularly bead granules, will easily dissolve in the concrete mixer and will be homogeneously dispersed in the concrete.

OTHER PUBLICATIONS

Young, editor, *Cements Research Progress,* Columbus: American Ceramic Society (1974).
Anon. *Chemistry of Cement,* Proceedings of the Fifth International Symposium, Tokyo, 1968 vol. IV (1969).
Anon. *Chemistry of Cement,* Proceedings of the Fourth International Symposium Washington, 1960, vol. II (1962).
Anon., "Admixtures for Concrete," Report No. AC1 1212.IR–81, Concrete International, pp. 24–53 (May 1981).
Anon., "Color in Concrete," *The Construction Specifier,* pp. 64–68, (Jun. 1983).
Anon., "Colour in Concrete," *New Zealand Concrete Construction,* pp. 5–10 (Apr. 1981).
Anon., "Colouring of Concrete," *New Zealand concrete Construction,* pp. 16–21 (Dec. 1984).
Anon., *Cements Research Progress* Columbus: American Ceramic Society (1982).
Bayer AG catalogue "The Perfect Design" (no date available).
Brady, et al., *Materials Handbook* 11 ed., (1977).
Buehrer, "Tips on Integrally Colored Concrete," *Concrete Construction,* pp. 445–447 (May 1987).
Capes, *Particle Size Enlargement,* Elsevier Scientific Publishing: Amsterdam. (1980).
Carr, "Pigment Powders, and Dispersions (Measurements and Interpretation of Their Physical Properties)," Pigment Handbook vol. III, ed. T.C. Patton, pp. 11–28, (1973).
*Cements Research Progress* Coordinating editor J.F.Young, American Ceramic Society: Columbus, p. 90 (1975).
Collepardi, "Water/Reducers/Retarders," *Concrete Admixtures Handbook—Properties, Science, and Technology,* edited by V.S. Ramachandran, Noyes Publications: New Jersey, p. 121 (1984).
Croushore, "Color: A Force in Construction," *Concrete International,* pp. 43–45 (Nov. 1985).
Dabney, "Color Conscious in America," Concrete pp. 22–24 (Oct. 1982).
Dabney, "Colored Architectural Concrete," *Concrete International,* pp. 32–36 (Jan. 1984).
Dabney, "Comparisons of Concrete Color Methods," *Concrete Construction* pp. 204–210–(May 1976).
Dabney, "Five Ways to Color Concrete," *Concrete Construction,* pp. 19–26 (Jan. 1982).
Dabney, "Impact of Color in Concrete," *Concrete International,* pp. 20–22 (Dec. 1990).
Dolch, "Air Entraining Admixtures," *Concrete Admixtures Handbook—Properties, Science, and Technology* edited by V.S. Ramachandran, Noyes Publications: New Jersey, p. 271 (1984).
Franklin, *Cement and Mortar Additives,* Second Edition, Noyes Data Corporation: New Jersey (1976).
Ghosh, editor, *Advances in Cement Technology,* Oxford:Pergamon Press, (1983).
Harcros Brochure promoting Ferrigran (no date available).
Lee, "Classifying and Selecting Spray Dryers," *Chemical Engineering Progress,* pp. 34–38 (Mar. 1981).
Lee, *Chemical Eng. Prog.,* pp. 34–38 (Mar. 1981).

Levine, "Lone Star Customizes Block in Earth Colors," *Concrete* pp. 20–22 (Feb. 1982).
Levine, "Organic (Temporary) Binders for Ceramic Systems," *Ceramic Age* pp. 39–42 (Jan. 1960).
Mailvaganam, "Miscellaneous Admixtures," Concrete Admixtures Handbook—Properties, Science, and Technology, edited by V.S. Ramachandran, Noyes Publications: New Jersey, p. 506–509 (1984).
Massazza, "Admixtures in Concrete," *Concrete Admixtures Handbook—Properties, Science, and Technology,* edited by Ramachandran, Noyes Publications: New Jersey, pp. 569–648 (1984).
Masters, "Applications of Spray Drying," *Spray Drying Handbook,* 4th ed., John Wiley & Sons: New York pp. 481–551 (1985).
Mattern, "Coloring Concrete—The Right Way," *Concrete International,* pp. 39–46 (Nov. 1985).
Mielenz, "Use of Surface–Active Agents in Concrete," *Proceedings of the Fifth International Symposium on the Chemistry of Cement,* Tokyo, vol. IV pp. 1–29 (1969).
Moore, et al. "Agglomeration of Dried Materials," *Chemical Engineering Progress,* 60(5):63–65 (May 1964).
Mortensen, et al., "Fluidized–Bed Spray Granulation," *Chemical Engineering Progress* pp. 37–42 (Apr. 1983).
Odenthal, "Controlling Color in Concrete Masonry," *Modern Concrete,* pp. 28–32 (Aug. 1979).
Patton, editor *Pigment Handbook,* vol. III, New York, John Wiley & Sons, (1973).
Pietsch, "Improving Powders by Agglomeration," *Chemical Engineering Progress,* 66(1):31–35 (1970).
Price, Admixtures and How They Developed, *Concrete Construction,* pp. 159–162 (Apr. 1976).
Quinn "How Spray Drying Can Improve Your Product," *Ceramic Industry* pp. 145–147 (Apr. 1957).
Raber, "Pigmentation of Concrete and Mortar," *Modern Concrete,* pp. 55–57 (Jun. 1974).
Ramachandran, "Superplasticizers," *Concrete Admixtures Handbook—Properties, Science, and Technology,* edited by Ramachandran, Noyes Publications: New Jersey, (1984).
Ramachandran, "Waster and Recycled Materials in Concrete Technology," *Advances in Cement Technology,* edited by S.N. Ghosh, Permagon Press: Oxford, pp. 667–668 (1982).
"Size Enlargement", Chemical Engineers' Handbook, edited by R.H. Perry and C.H. Chilton, 5th ed. McGraw Hill: New York pp. 8–57–8–65 (1973).
Teichman, "Practical Methods for Determining the Tint Strength of Pigments in Concrete," *Concrete Precasting Plant and Technology,* Issue 11 (1993).
Vivian, "Some Chemical Additions and Admixtures in Cement Paste and Concrete," *Chemistry of Cement,* Proceedings of the Fourth International Symposium, Washington, vol. II, National Bureau of Standards Monograph 43(11):909–923 (1960).
Willows, "Roofing America with Concrete," *Concrete International,* pp. 25–27 (Jul. 1986).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11 is confirmed.

New claims 12–21 are added and determined to be patentable.

12. *The process of claim 1, wherein said mixing step is carried out in concrete mixing equipment.*
13. *The process of claim 1, wherein said mixing step is carried out by:*
   *a. placing saiid pigment-containing granules, cement and aggregate in concrete mixing equipment; and*
   *b. mixing said pigment-containing granules, cement and aggregate in said concrete mixing equipment.*
14. *The process of claim 1, wherein said pigment-containing granules are not ground before said mixing step.*
15. *The process of claim 1, carried out by mixing said pigment-containing granules with cement and aggregate without pregrinding said granules.*
16. *The process of claim 1, consisting essentially of said mixing step.*
17. *The process of claim 11, wherein said mixing step is carried out in concrete mixing equipment.*
18. *The process of claim 11, wherein said mixing step is carried out by:*
   *a. placing said pigment-containing granules, cement and aggregate in concrete mixing equipment; and*
   *b. mixing said pigment-containing granules, cement and aggregate in said concrete mixing equipment.*
19. *The process of claim 11, wherein said pigment-containing granules are not ground before said mixing step.*
20. *The process of claim 11, carried out by mixing said pigment-containing granules with cement and aggregate without pregrinding said granules.*
21. *The process of claim 11, consisting essentially of said mixing step.*

* * * * *